United States Patent
Shaw

(10) Patent No.: US 9,701,063 B2
(45) Date of Patent: Jul. 11, 2017

(54) AIR-COOLED BELT SPLICER

(71) Applicant: Shaw-Almex Industries Limited, Parry Sound (CA)

(72) Inventor: Timothy Glen Shaw, Stoney Creek, CA (US)

(73) Assignee: SHAW-ALMEX INDUSTRIES LIMITED, Parry Sound, Ontario (CA)

(*) Notice: Subject to any disclaimer, the term of this patent is extended or adjusted under 35 U.S.C. 154(b) by 0 days.

(21) Appl. No.: 14/787,032

(22) PCT Filed: Apr. 28, 2014

(86) PCT No.: PCT/CA2014/000375
§ 371 (c)(1),
(2) Date: Oct. 26, 2015

(87) PCT Pub. No.: WO2014/172782
PCT Pub. Date: Oct. 30, 2014

(65) Prior Publication Data
US 2016/0089836 A1 Mar. 31, 2016

(30) Foreign Application Priority Data
Apr. 26, 2013 (GB) .................... 1307592.4

(51) Int. Cl.
*B29C 35/16* (2006.01)
*B29C 73/30* (2006.01)
(Continued)

(52) U.S. Cl.
CPC ............ *B29C 66/855* (2013.01); *B29C 35/16* (2013.01); *B29C 65/18* (2013.01); *B29C 66/43* (2013.01); *B29C 66/4324* (2013.01); *B29C 66/81455* (2013.01); *B29C 66/90* (2013.01); *B29C 73/30* (2013.01); *B30B 15/34* (2013.01); *F16G 3/10* (2013.01); *F16G 3/16* (2013.01);
(Continued)

(58) Field of Classification Search
CPC ..... B29C 66/4324; B29C 66/855; F16G 3/10; F16G 3/16
See application file for complete search history.

(56) References Cited

U.S. PATENT DOCUMENTS 3,969,051 A * 7/1976 Hovila .................... B29C 35/02
425/11
5,562,796 A * 10/1996 Ertel ....................... B29C 65/18
100/258 A
(Continued)

FOREIGN PATENT DOCUMENTS

CA 1055666 6/1979
CA 2149061 11/1995
(Continued)

OTHER PUBLICATIONS

Almex Group, Vortex Air Series Vulcanizing Press, Jun. 2013.
(Continued)

*Primary Examiner* — Mark A Osele
(74) *Attorney, Agent, or Firm* — Anthony Asquith Corp.

(57) ABSTRACT

Cool-down time is menimized by the use of a cooler having integral fins of high surface area, and the use of high-efficiency fans. Heat-up time is minimized by the low mass of the cooler, and the prevention of transmission of heat to the housing.

19 Claims, 11 Drawing Sheets

(51) Int. Cl.
    *B29C 65/18* (2006.01)
    *B29C 65/00* (2006.01)
    *B30B 15/34* (2006.01)
    *F16G 3/10* (2006.01)
    *F16G 3/16* (2006.01)
    *B29K 105/00* (2006.01)
    *B29K 221/00* (2006.01)
    *B29L 29/00* (2006.01)

(52) U.S. Cl.
    CPC .... *B29K 2105/253* (2013.01); *B29K 2221/00* (2013.01); *B29L 2029/00* (2013.01)

(56) References Cited

U.S. PATENT DOCUMENTS

| | | | |
|---|---|---|---|
| 7,802,601 B2* | 9/2010 | Marzona | B29C 65/18 156/498 |
| 9,090,022 B1* | 7/2015 | van't Schip | B29C 65/18 |

FOREIGN PATENT DOCUMENTS

| | | |
|---|---|---|
| EP | 1306579 A1 | 5/2003 |
| KR | 2012 0055074 A | 5/2012 |
| SU | 1612157 A1 | 12/1990 |
| WO | WO-2010/012117 A1 | 12/2010 |

OTHER PUBLICATIONS

Contitech Group of Continental AG, Installing and Splicing Textile Converyor Belts, (pulbication date unknown).
Micronel AG, Miniature Radial Blower, 2001.
Almex Group, Conveyor Belt Vucanizers, 2014.
Almex Group, Lightweight Portable Presses, Dec. 2011.
Almex Group, Sectional Vulcanizing Press, Nov. 2011.
Almex Group, Fabric Belt Splicing Tool Kit, Dec. 2011.
Almex Group, Vortex Air Series, Dec. 18, 2013.
Almex Group, Almex Pad Junion, Aug. 14, 2013.
Novitool Aero Splice PressSafety and Operating Manual, Dec. 31, 2010; pp. 1-24, XP0055330257, retrieved from internet.

* cited by examiner

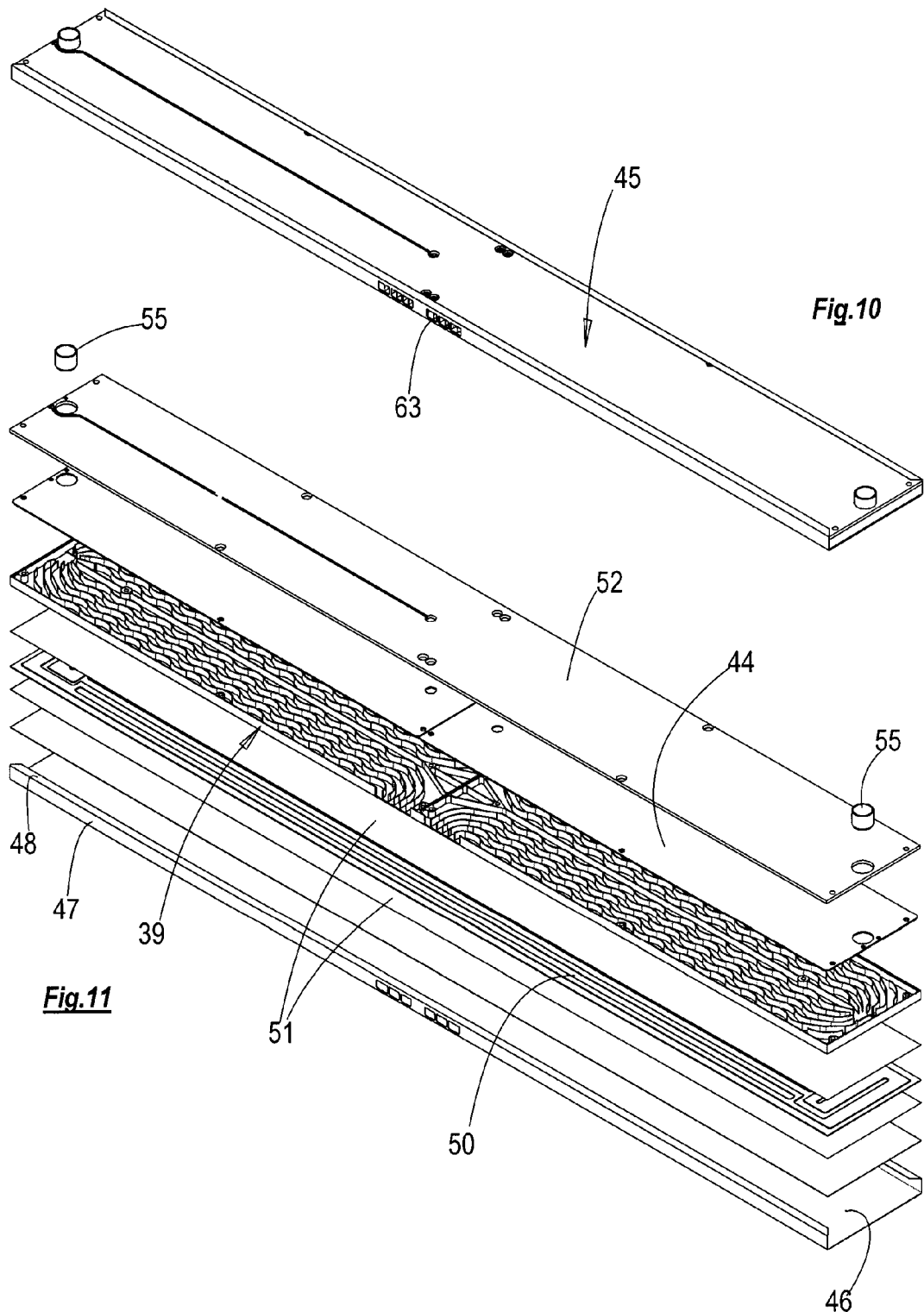

AIR-COOLED BELT SPLICER

This technology relates to apparatus for carrying out belt-splicing operations on conveyor belts. An apparatus as described herein is portable, and can be transported to the conveyor for the purpose of effecting the splice, in situ. Also, the apparatus is suitable for in-factory or in-shop usage, to perform splices on as-manufactured belts, or to effect repairs to belts, one after another.

BACKGROUND

The technology is a development of the belt-splicing technology described in the Vortex Air-cooled Press Operating Manual, published by Shaw-Almex Industries Limited, which is incorporated herein.

In the new technology, the splicer includes a top platen assembly and a bottom platen assembly, which are positioned respectively over and under the to-be-spliced belt-ends. The two platens include respective pressure-surfaces, being surfaces that press directly against the splice-area, i.e against the ends of the belt that are to spliced. Both platens have their own heaters, which operate to heat the respective pressure-surfaces, and thus to heat the belt.

The pressure-surface of one of the platen-assemblies is capable of moving towards and away from the belt, with respect to its housing. That platen includes a pressure-bag, which, when inflated, moves the platen, and thereby applies compressive pressure to the splice. The pressure-surface in the other platen-assembly is not movable.

In some types of splicing, the applied heat and pressure serves to vulcanize rubber in the belt and in the splice, but in the kinds of belts that are served by the current technology, generally the belt is of, or includes, a thermoplastic material, and the heat serves to put the material into the plastic zone, such that, upon cooling, the two ends are bonded very securely. The temperatures and pressures required for vulcanization of rubber belt-ends are generally significantly higher than those for thermoplastic belts. The distinction is made between heavy-duty presses, which are robust enough to perform vulcanizations, and light-duty presses which. although less costly, are able to provide the lower temperatures and pressures as required for thermoplastic belts. The press as described herein is a light-duty press.

The technology is concerned with air-cooled presses, and particularly with how rapidly the pressure-surfaces of the splicer can be heated, and can be cooled after the period of heating. For rapid heating, the basic aim is to minimize the mass of the portion of the press that has to be heated, and to use efficient heaters. For rapid cooling, the aim is to provide a high flowrate of cooling air, and to provide sufficient sq.cm of hot metal exposed to the cooling air.

THE PRIOR ART

Splicing presses are known in which the press is air-cooled, and are known in which the press is water-cooled. In air-cooled presses, traditionally, only the top platen has been cooled. In water-cooled presses, it is known to cool both platens. However, designing an air-cooling system is not just a matter of simply taking a design for water-cooling, and replacing the water with air. It is the case that the shape and layout of air-cooled splicing presses do not favour the use of air to procure rapid heat-up and cool-down times.

DETAILED DESCRIPTION OF PREFERRED EMBODIMENTS

The technology will now be further described with reference to the accompanying drawings, in which:

In FIG. 4, preparations are being made for a splicing operation.

In FIG. 5, the splicing operation is under way.

FIG. 10 is a pictorial view of the thermal tray-assembly.

FIG. 11 is an exploded view of the several components and layers of the tray-assembly of FIG. 10.

Figure 1:
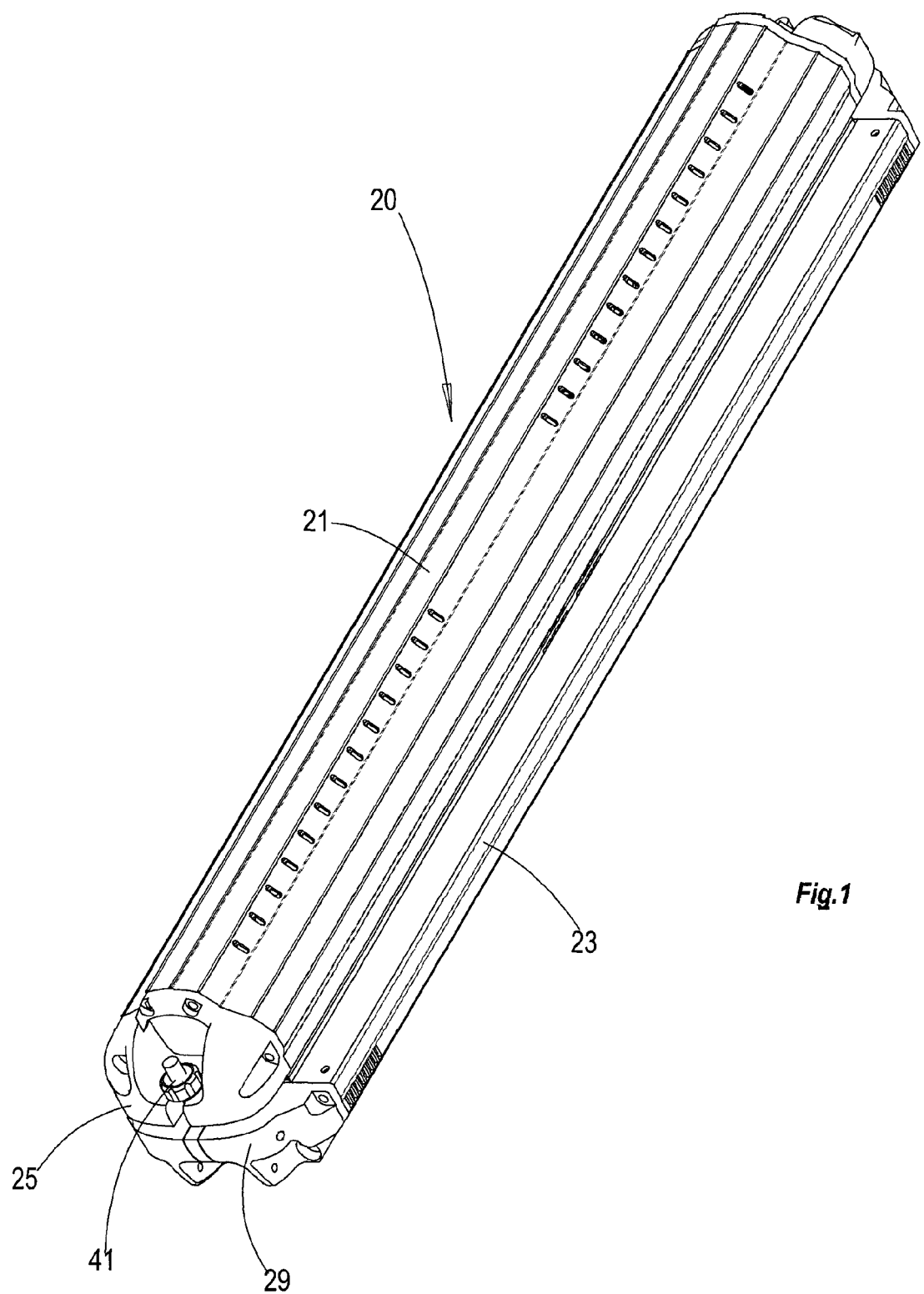
FIG. 1 is a pictorial view of a belt splicer.

The belt splicer 20 shown in the drawings includes a top housing 21 and a bottom housing 22. Also, a top left end-cap 23, a top right end-cap 24, a bottom-left end-cap 25, and a bottom-right end-cap 26. The housings 21,22 are aluminum extrusions. The top end-caps 23,24 are bolted to threaded sockets formed in the top housing extrusion 21—likewise for the bottom components.

Figure 4:
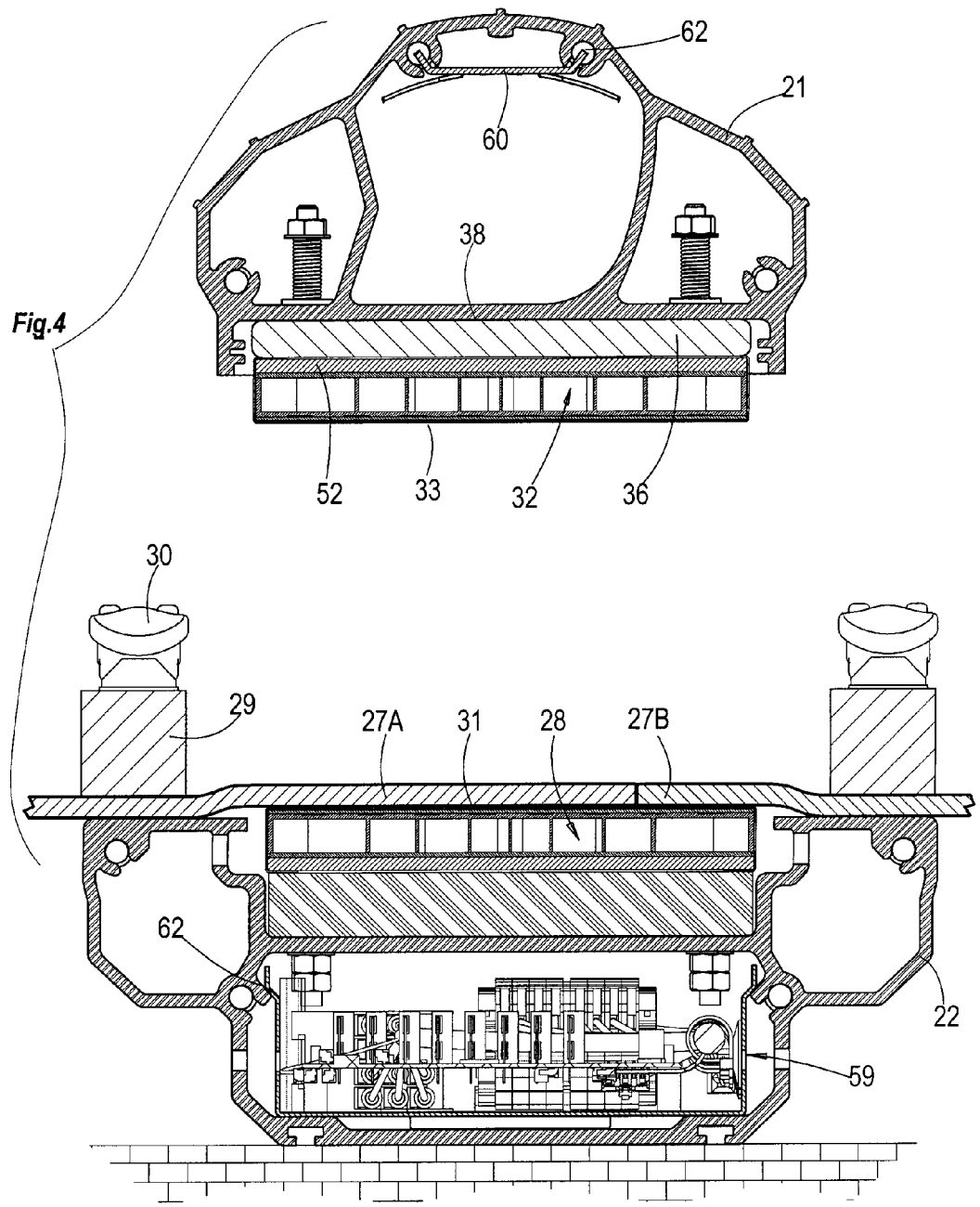
FIG. 4 is a sectioned end elevation showing the top and bottom housings of the splicer, shown separated.

In FIG. 4, the splicer 20 is being prepared for a splicing operation. The bottom housing 22 is resting on a firm support. The top-housing 21 is separated from the bottom-housing at this point. The ends of the belt 27A,27B to be spliced are laid over a bottom platen-assembly 28, and are clamped in place with clamping bars 29 and handles 30. (Generally, with the kind of splicing technology employed herein, the belt-ends are form-punched into tapered fingers, which interlock at the splice area.) An upward-facing top surface 31 of the bottom platen-assembly 28 is in direct contact with the belt 27.

Figure 5:
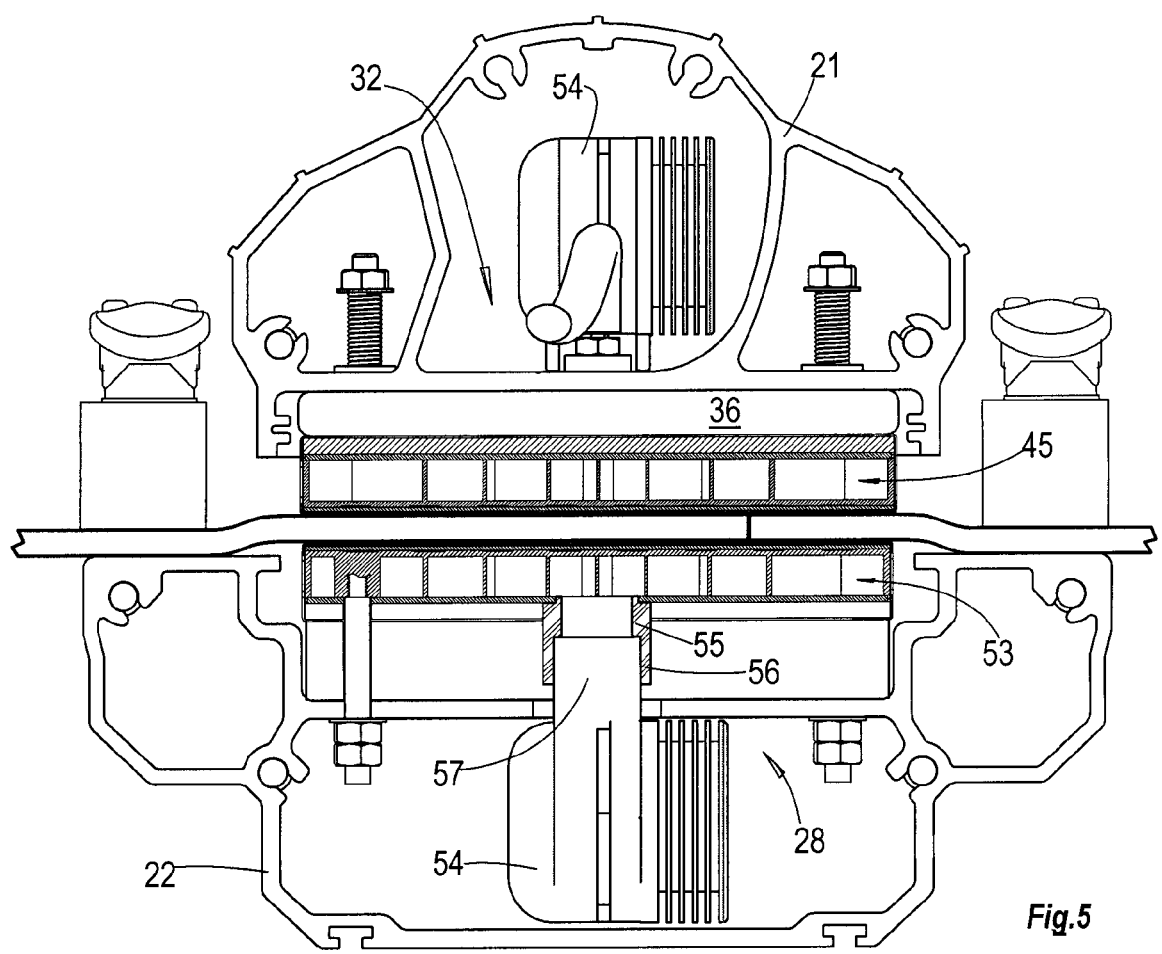
FIG. 5 is an end-view of the splicer, shown with end-caps removed, and showing high-performance fans of the splicer.

As shown in FIG. 5, the top housing 21, with a top-platen-assembly 32 attached, is lowered down onto the belt. A downward-facing bottom surface 33 of the top platen-assembly 32 is in direct contact with the belt. The operators secure the top housing 21 to the bottom housing 22 by means of screw-clamps 34 located in the ends of the splicer.

Figure 2:
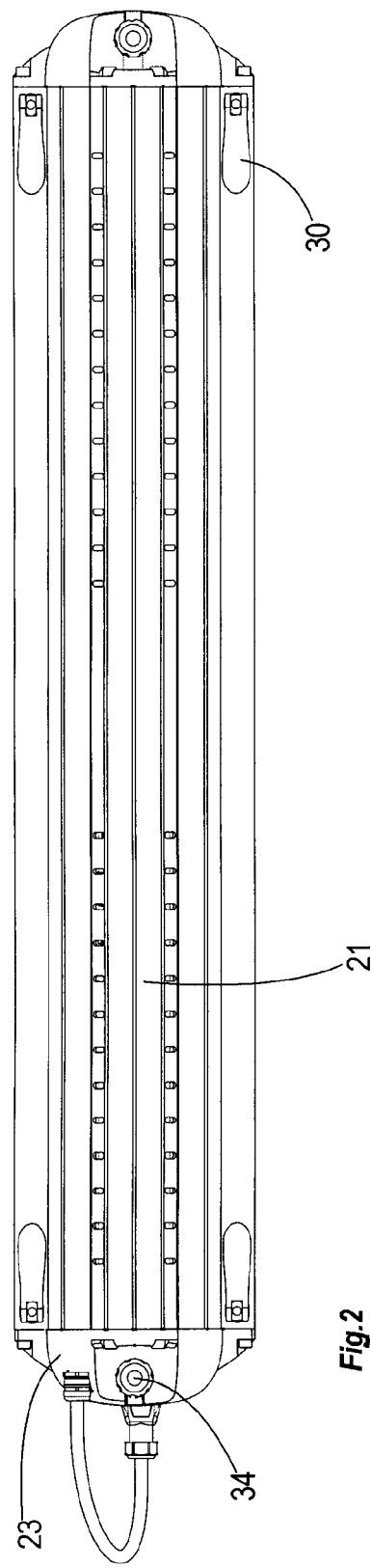
FIG. 2 is a plan view of the assembled splicer.
Figure 3:
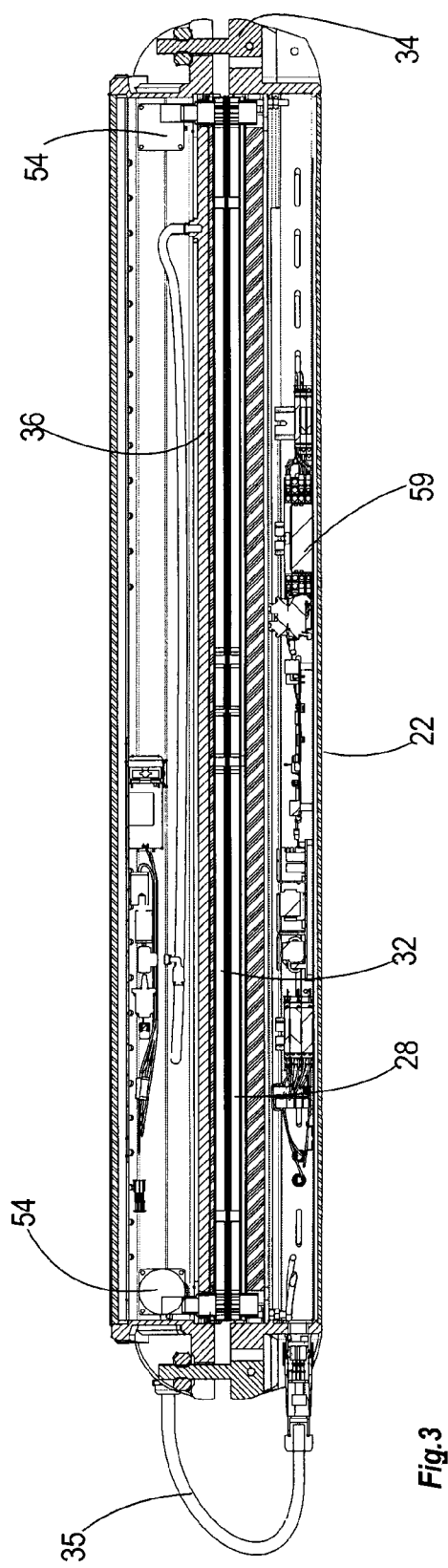
FIG. 3 is a sectioned side-elevation of the assembled splicer.

The electrical connections having been made, and the safety checklist having been completed, now the splicing operation can be carried out. FIG. 5 shows the splicer in the assembled condition. A tether-cable 35 (FIGS. 2,3) provides electrical-power and sensor-signal connection between the housings. A cord (not shown) connects the splicer to e.g 13-amp, 110-volt-AC mains.

A pressure-bag 36 of the splicer 20 is inflated to the required target pressure, to apply compressive pressure to the splice area of the belt. Heaters in the splicer are switched on, and during the warm-up phase (which takes a few minutes) the belt is brought up to the target hot-temperature.

When the hot-temperature is reached, the heaters are operated to maintain the hot-temperature during a heat-soak phase (which takes another few minutes). The pressure-bag 36 remains inflated during the heat-soak phase. After the heat-soak is completed, the heaters are switched off, and the air-blowers are switched on during the cool-down phase (which takes a further few minutes). The pressure-bag remains inflated also during the cool-down phase.

After the belt has cooled down to the target cool-temperature, now the operators deflate the pressure-bag. The operators unfasten the top housing 21 from the bottom housing 23, and remove both housings from the now-spliced belt.

The present technology is aimed at reducing the length of the warm-up phase, and reducing the length of the cool-down phase, and thus reducing the overall cycle time of the splicing operation.

Figure 7:
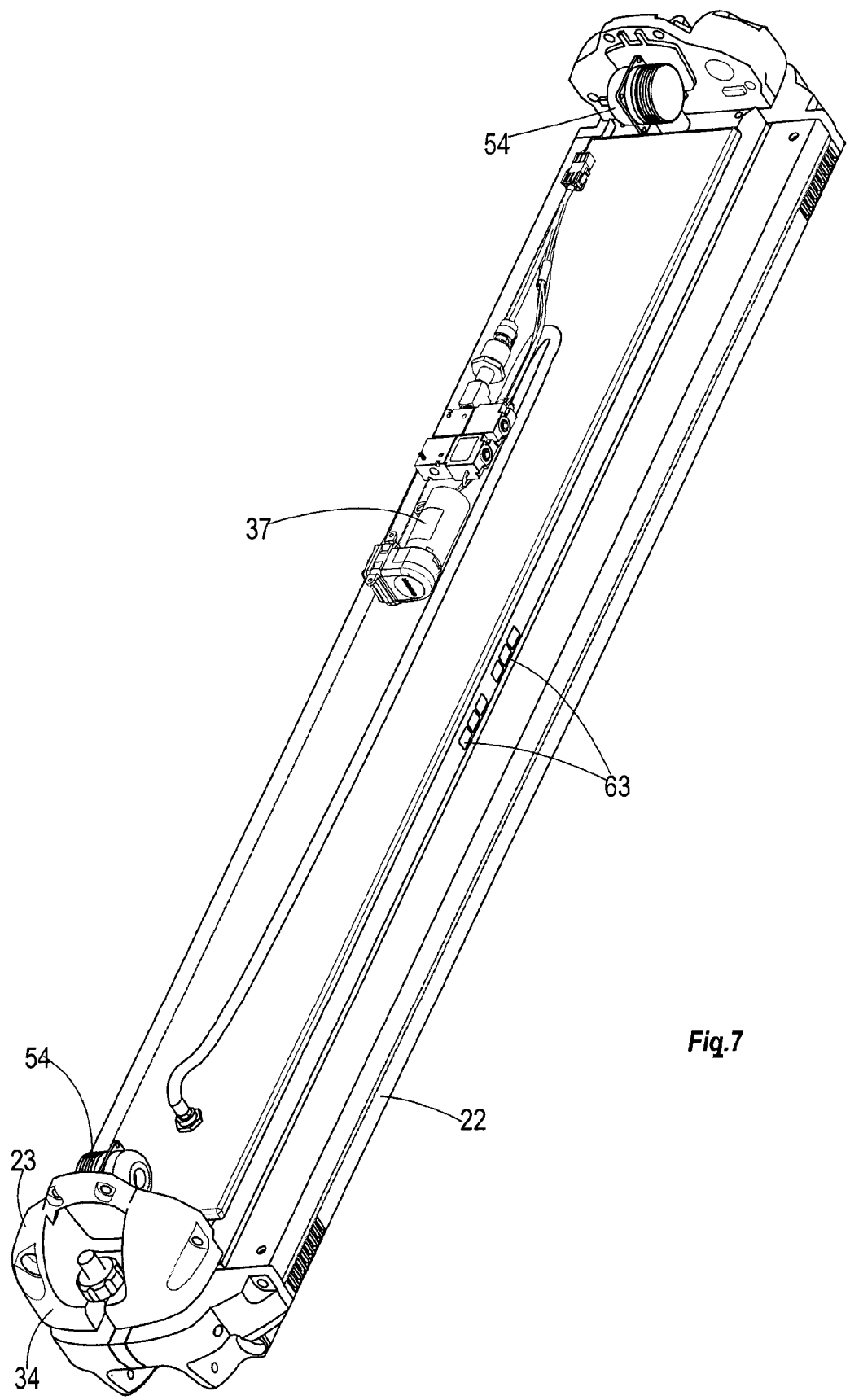
FIG. 7 is the same view as FIG. 1, but with a top-housing removed.

FIG. 7 is a view of the splicer 20 with the top housing 21 removed. The pressure-bag 36 is connected by a hosepipe to an electrically-powered air-compressor 37, which can be operated to inflate the pressure-bag. (It will be understood that the bag 36 is blocked from inflating upwards when pressurized because the top surface of the bag 36 abuts against a surface 38 (FIG. 4) of the top housing 21.)

Figure 8:
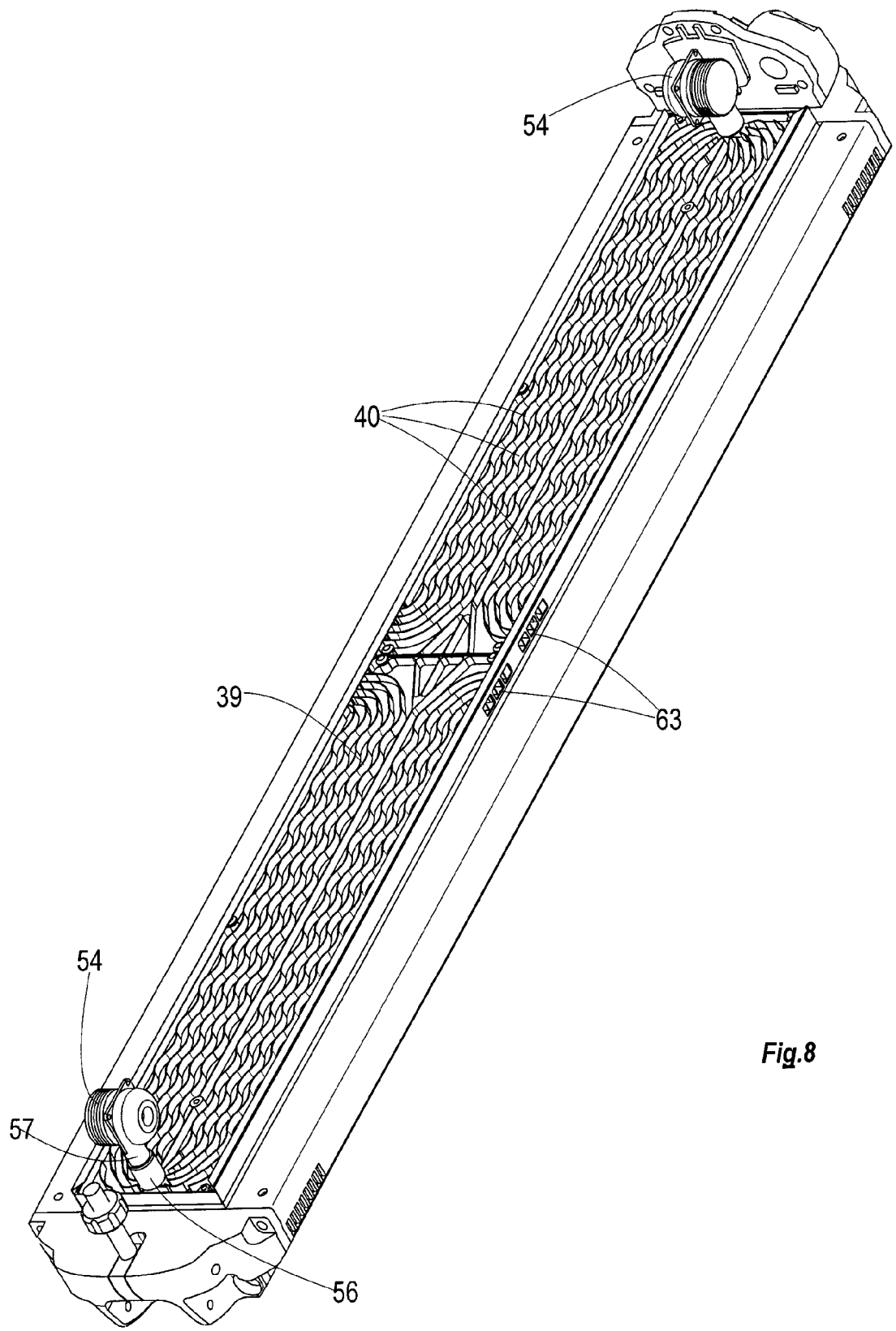
FIG. 8 is the same view as FIG. 7, but with a pressure-bag of the apparatus removed, and with a cover removed.

In FIG. 8, the pressure-bag 36 has also been removed, exposing the cooler 39. The cooler is formed from a unitary block of aluminum, in which the fins 40 have been formed by machining away the spaces 41 between the fins 40.

Figure 9:
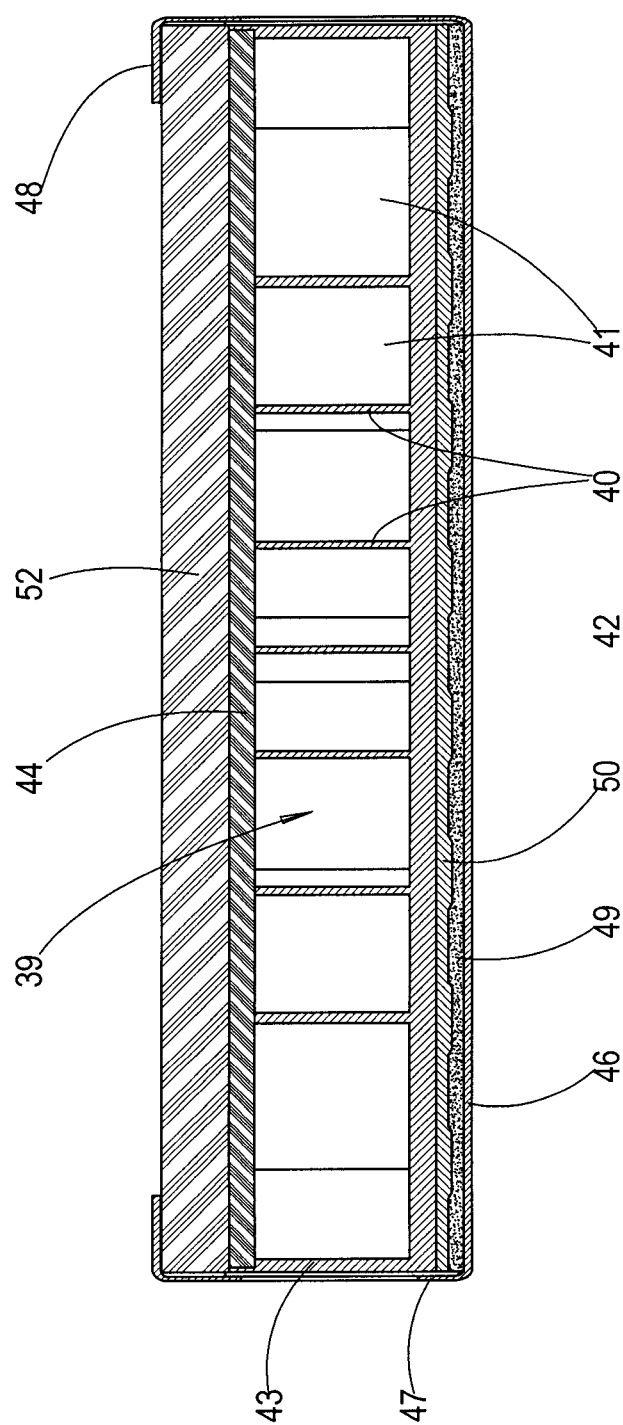
FIG. 9 is a cross-section of a thermal tray-assembly of the splicer. (Note: the height dimension has been doubled in FIG. 9, for clarity of detail.)

As shown in FIG. 9, the cooler 39 is a monolith comprising a base-plate 42 and the several upstanding fins 40. The cooler also includes side-walls 43. A cover 44 of insulating plastic (phenolic) material is secured into a recess in the side-walls. (The cover 44 has been removed in FIG. 7.)

FIG. 9 shows the several components of a thermal-tray assembly 45. The thermal-tray assembly 45 is shown pictorially in FIG. 10. The components of the thermal-tray assembly are shown exploded in FIG. 11.

The assembly 45 is based on a sheet metal (stainless steel) tray 46, having folded-up sidewalls 47 and folded-in lips 48 which form a partial roof. (The bottom or undersurface of the stainless steel tray 46 is the downwards facing bottom surface 33 of the top-platen assembly 32.) Next up from the floor of the tray 46 is a layer of (electrically conductive) graphite 49.

Above that is the electrical heating pad 50. Electrically-insulating layers or films 51 of Kapton® are placed above and below the heating pad 50, in case of an electrical fault in the pad. (Though highly electrically-insulative, the Kapton® films 51 offer barely any resistance to transmission of heat.) The films 51 are not shown in FIG. 9.

The cooler 39 rests on top of the heating pad 50 (actually on top of the upper Kapton® film 51). As mentioned, the plastic cover 44 is secured (with screws) to the side-walls 43 of the cooler. The cover 44 lies in contact with the tips of the fins 40. Thus, when the pressure-bag 36 is inflated, the cover is pressed down against the fins 40, whereby the fins are transmitting the pressure-force to the belt.

On top of the cover 44 is a layer 52 of plastic heat-insulation material. The cooler 39 of course becomes hot when the heating pad is switched on, and the insulating layer 52 protects the pressure-bag from that heat.

FIG. 10 is a view of the assembled layers, which are arranged to be slidable into the cavity created by the shape of the stainless steel tray 46. The height of the stack of layers (which includes the cooler 39) is such that, when the stack has been inserted into the cavity, the fit is tight enough to retain the stack therein.

FIGS. 9,10,11 show the top thermal-tray assembly. The bottom thermal-tray assembly 53 is a mirror-image of the top thermal-tray assembly.

The graphite layer 49 in the thermal-tray assemblies provides heat-conductive compliance and conformance, and is aimed at eliminating differences and gradients of temperature over the bottom-surface of the floor of the stainless steel tray—being the surface 33 of the splicer that directly contacts the belt being spliced. (In fact, often, operators place a thin sheet of a non-stick plastic material between the bottom-surface 33 and the belt, to prevent sticking. The above word "directly" should be construed to include the possible presence of such sheet.)

Figure 12:
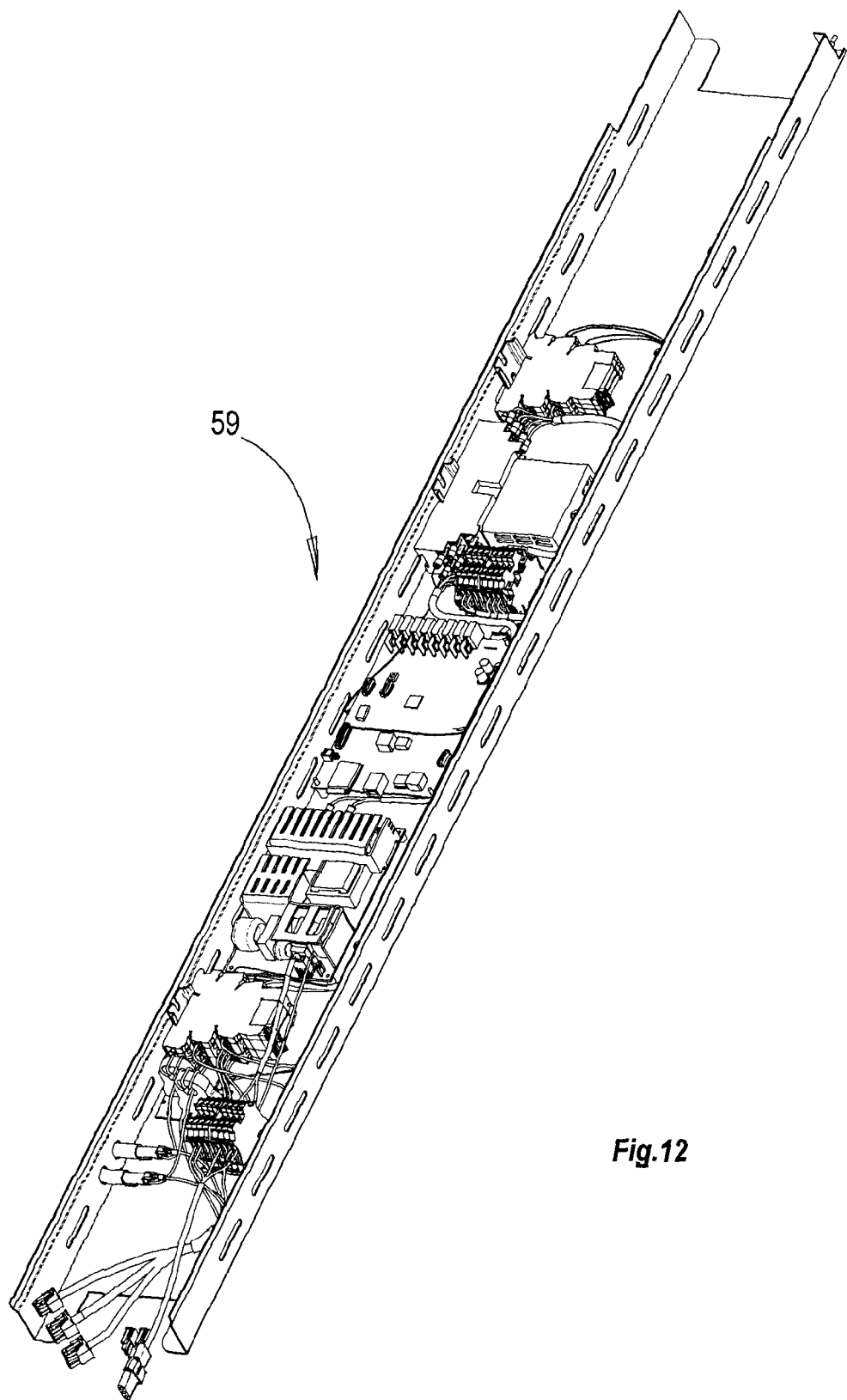
FIG. 12 is a pictorial view of an assembled controller tray-assembly of the splicer.

FIG. 12 shows a controller sub-tray assembly 59. This assembly carries control components and connectors, for receiving signals from temperature and other sensors, and a processor for automatically controlling the phases and operations of the splicer in response to the signals. This tray slides into the bottom housing 22.

Figure 13:
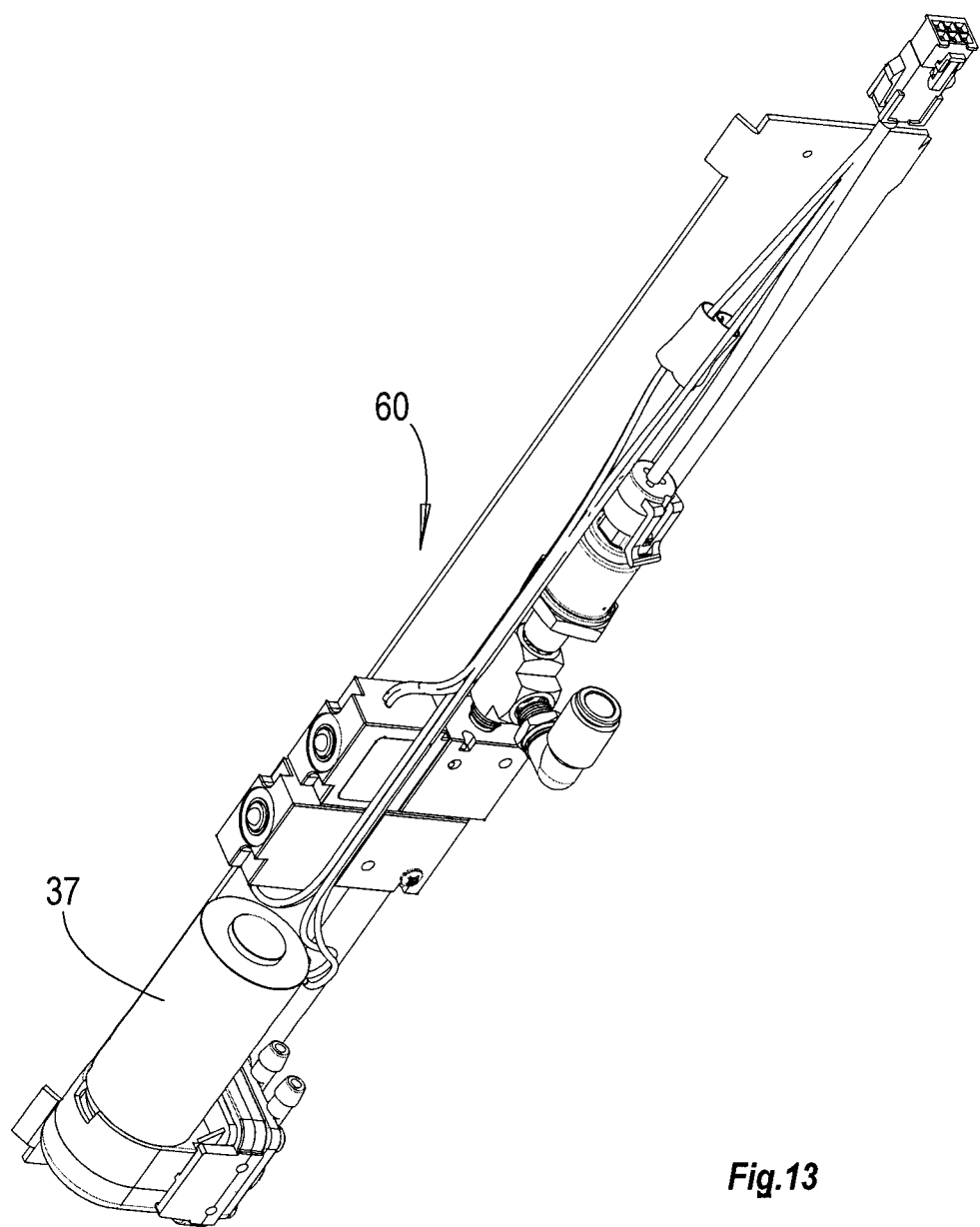
FIG. 13 is a pictorial view of an assembled inflator tray-assembly of the splicer (seen from underneath).

FIG. 13 shows an inflation sub-tray assembly 60, which carries the air compressor 37 for inflating the pressure-bag 38, and a tube or hose for connecting to same. This tray slides into the top housing 21. In fact, the slideways 62 for the inflation-tray assembly are in the roof of the top housing, and the components are mounted underneath the tray.

Cooling of the belt is done by blowing cooling air through the spaces 41 between the fins 40 of the top and bottom coolers 39. The air-blowers, or fans, preferably should have the following properties.

In the splicer 20, there are two top fans and two bottom fans. The example splicer has the capacity to splice belts of 1.5 meters width. (Smaller splicers can be provided with one top fan and one bottom fan. The top fan by itself, or the top fans together, have the capability to move air at a flowrate of at least three hundred liters per minute, multiplied by the maximum belt width (MBW) of the particular splicer. The bottom fan or fans should have a similar performance.

The fans should be highly efficient. Preferably, each fan should have the capability to deliver the said air-flowrate against a pressure head of twenty psi centimeters of water, upon being supplied with half a kilowatt of electricity or less.

The fans should also be compact, given that space is at a tight premium inside the profiles of the top and bottom housings. The housing of the fan has the basically-cylindrical form arising from housing an electric motor which is coaxially in-line with the fan-blades, and includes a volute-chamber and a tangential outlet-tube for collecting the pressurized air and conveying same out of the fan. That being so, the fan should be small enough to fit in a cubic box six cm by six cm by six cm. (It should be noted that the length of the outlet-tube of the fan is not included in this size stipulation—because the length of the outlet-tube is determined by criteria other than the compactness of the fan housing and the fan unit.)

The actual fan (four of them) used in the exemplary splicer 20, as described herein, was obtained from Micronel AG, VH-8307 Tagelswangen, Switzerland (www.micronel.ch), under the product name Miniature Radial Blower, catalog product designation U51DL-024KK-4, and was found to be satisfactory from the standpoints of flowrate created, energy efficiency, and compactness.

Figure 6:
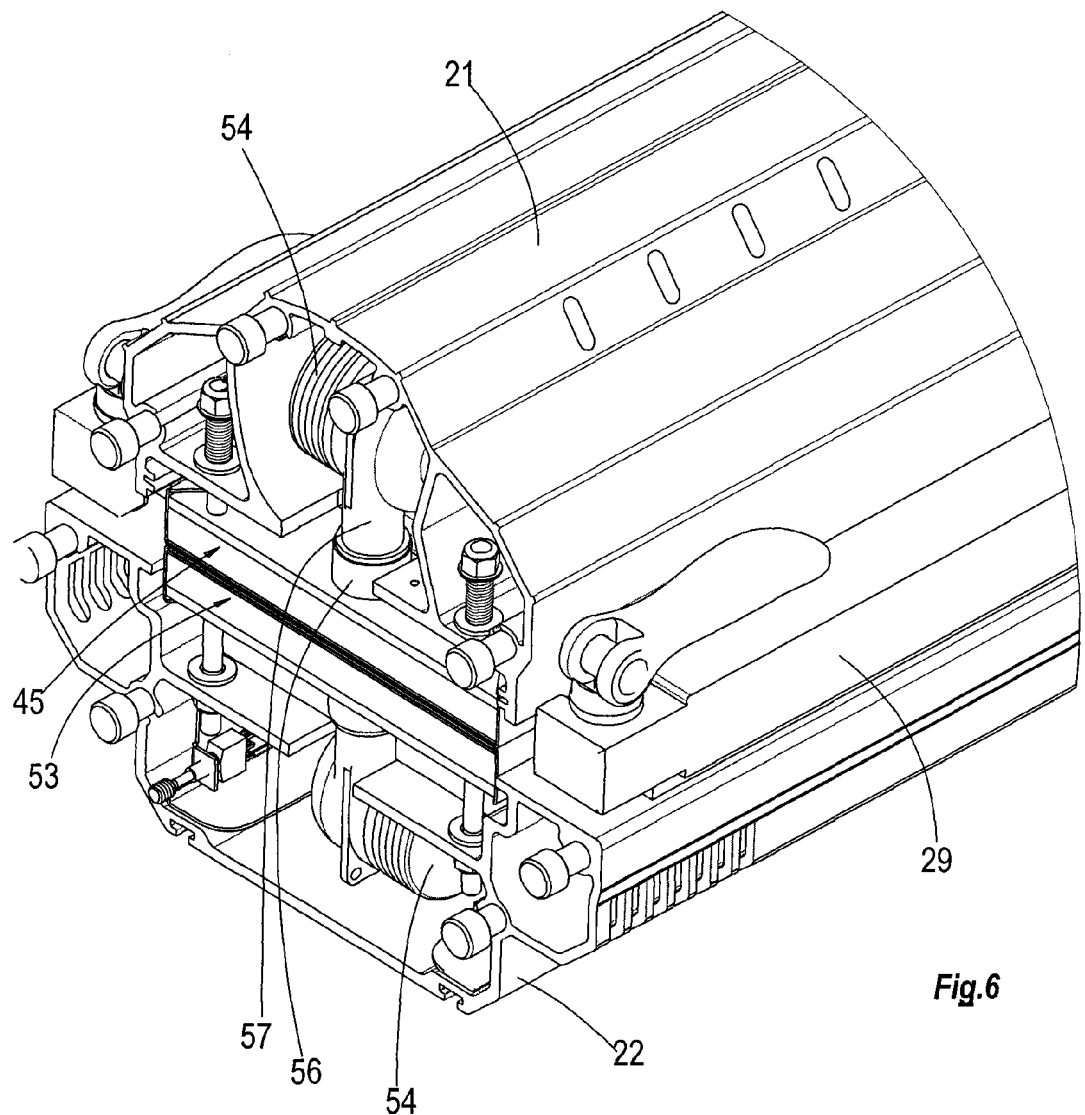
FIG. 6 is a pictorial view of one end of the splicer, with end-caps removed.

The locations of the top fans are shown in FIGS. 5,6,7,8, and one of the bottom fans in FIG. 6. Each fan is attached to the cover 44 of the cooler. A length of rigid tubing 55 is cemented into a hole in the cover plate 44. A length of semi-flexible tubing 56 is a tight fit over a length of rigid tubing 55. The outlet-tube of the fan is of such diameter that the outlet-tube can be inserted into the length of semi-flexible tubing. This manner of mounting the fan is simple and yet very secure. No other mounting structure is needed, other than to push the outlet-tube of the fan into the tubing.

The cooler is so arranged that air from the fans is received into the spaces between the fins of the cooler, and is directed by the layout of the top fins lengthwise along the cooler. The fins are arranged to direct heated air (i.e air that has performed its cooling function) through openings in the side-walls of the metal-tray 46.

The cooler should be structured so that the aggregate surface area of the metal of the top base-plate and top fins that is exposed to fan-blown cooling air during the cool-down phase is 2500 sq.cm per meter length of the base-plate, or more. In the example, the exposed area was 3800 sq.cm per meter length. In the example, the fins protruded ten mm out from the base-plate.

From the standpoint of rapid heat-up, the components that have to be heated should be kept to a minimum. The cooler 39 has to be heated, and also the metal tray 46. And the metal tray is physically exposed, so it has to be chunky (in the example, the sheet metal plate is one mm thick.) Thus, the heat capacity of the steel tray 46 is considerable. The mass of the cooler is small, which is beneficial (not only for portability of the splicer) but because the lower the thermal capacity of the cooler, the quicker it warms up, and the less energy it takes. The heat-up phase in traditional splicers has taken e.g fifteen or twenty minutes; in the example, that time can be reduced to e.g four or five minutes.

The mass of the cooler preferably should be no more than 1½ kilograms per meter length of the base-plate. In the example, the mass of the aluminum cooler was one kg per meter length.

The two main factors in reducing heat-up time are the low thermal capacity of the components that have to be heated, and also because precautions have been taken, in the new design, to ensure that as little heat as possible (and preferably none) of the heat from the heater is wasted by heating up the housings. Thus, in the present design, the components that have to be heated do not touch the housing, and therefore shed no, or only minimal, heat to the housing.

During the cool-down phase, the cooler has to conduct heat rapidly away from the belt. The heat from the belt has to travel through the metal of the tray 46, through the graphite layer 49, and through the heater pad 50, before reaching the underside of the base-plate 42 of the cooler, and then the heat must pass through the base-plate before it can be dissipated into the air passing through the spaces 41 between the fins 40. These barriers are the reason why rapid cooling is difficult to achieve, in an air-cooled press. In conventional belt splicers, the cool-down phase can occupy e.g fifteen or twenty minutes; that time has been reduced to about four minutes in the exemplary design.

KAPTON is a registered trademark of E I du Pont de Nemours And Company.

The scope of the patent protection sought herein is defined by the accompanying claims. The apparatuses and procedures shown in the accompanying drawings and described herein are examples.

The numerals used in the drawings are listed as:
20 belt splicer
21 top housing
22 bottom housing
23 top left end cap
24 top right end cap
25 bottom left end cap
26 bottom right end cap
27A,27B ends of belt to be spliced
28 bottom platen assembly
29 clamping bars
30 clamping handles
31 upward-facing top surface of bottom-platen
32 top platen assembly
33 downward-facing bottom surface of top-platen
34 screw clamps
35 tether cable
36 pressure-bag
37 air compressor
38 air-bag surface of top housing
39 aluminum cooler
40 fins of cooler
41 spaces between fins
42 base-plate of cooler
43 side-walls of cooler
44 plastic cover of cooler
45 thermal-tray assembly
46 sheet metal tray
47 folded-up side-walls
48 folded-in lips
49 layer of graphite
50 electrical heating pad
51 films of Kapton®
52 layer of heat-insulation material
53 bottom thermal-tray assembly
54 air-blower/fan
55 rigid tubing, fixed to cover 44
56 semi-flexible tubing
57 outlet tube of the fan
59 controller sub-tray assembly
60 inflation sub-tray assembly
62 slideways in top housing
63 exhaust openings in the sidewalls of the tray

The invention claimed is:
1. Belt-splicer, for making splices in conveyor belts, which includes:
top and bottom housings, structured to have the capability:
(a) to be assembled over the belt-ends to be spliced, the maximum-belt-width that can be accommodated by the splicer being MBW meters;
(b) during splicing, to enable heat and pressure to be applied to the splice;
(c) after splicing, to be separated and removed from the belt;
a top platen assembly, which includes:
(a) a top pressure surface, being the surface of the splicer that presses downwards against the top of the belt splice during a splicing operation;
(b) an operable top heater, which is effective when operated to heat the top pressure surface;
(c) a top cooling assembly, which draws heat from the top pressure surface, and thus cools the belt; and the top cooling assembly includes:
(c)(i) a top cooler, comprising a top base-plate having top cooling fins;
(c)(ii) an operable top air-blower, which is effective when operated to blow cooling air through top spaces between the top fins of the top cooler;
a bottom platen assembly, which includes:

(a) a bottom pressure surface, being the surface of the splicer that presses upwards against the bottom of the splice during a splicing operation;
(b) an operable bottom heater, which is effective when operated to heat the bottom pressure surface;
(c) a bottom cooling assembly, which draws heat from the bottom pressure surface, and thus cools the belt; and the bottom cooling assembly includes:
(c)(i) a bottom cooler, comprising a bottom base-plate having bottom cooling fins;
(c)(ii) an operable bottom air-blower, which is effective when operated to blow cooling air through bottom spaces between the bottom fins of the bottom cooler;
an inflatable pressure-bag, and structure for inflating same with a fluid under pressure;
the splicer is so structured that, when the pressure-bag is inflated, the top and bottom pressure surfaces are urged together, to apply compression to the splice;
a controller, which is effective to enable:
first a heat-up phase, in which the pressure-bag is inflated and the top and bottom heaters are operated to raise the belt to a hot temperature;
second a timed heat-soak phase, in which the pressure-bag remains inflated and the top and bottom heaters are operated to maintain the belt at the hot temperature;
third a cool-down phase, in which the heaters are switched-off, the pressure-bag remains inflated, and the top and bottom air-blowers are operated to cool the belt to a cool temperature;
fourth a switch-off phase, when the belt is cool, in which the heaters and the coolers are switched off, the pressure-bag is deflated, and the controller enables the housings to be separated and the splicer to be removed from the now-spliced belt.

2. The belt-splicer of claim 1, wherein:
the top air-blower includes a top fan or fans;
the top fan by itself, or the top fans together, have the capability to move air at a flowrate of three hundred liters per minute, multiplied by MBW, or more;
the bottom air-blower includes a bottom fan or fans;
the bottom fan by itself, or the bottom fans together, have the capability to move air at a flowrate of three hundred liters per minute, multiplied by MBW, or more.

3. The belt-splicer of claim 2, wherein each air-blower is efficient, in that the blower can deliver the said air-flowrate against a pressure head of twenty centimeters of water, upon being supplied with half a kilowatt of electricity or less.

4. The belt-splicer of claim 2, wherein each air-blower is a compact fan, in that a housing of the fan:
(a) has the basically-cylindrical form arising from housing an electric motor which is coaxially in-line with fan-blades;
(b) includes a volute-chamber and a tangential outlet-tube for collecting the pressurized air and conveying same out of the fan;
(c) has such overall dimensions, over the motor and the volute-chamber, but not including the length of the outlet-tube, that the fan can fit in a cubic box six cm by six cm by six cm.

5. The belt-splicer of claim 1, wherein:
the top fins and the top base-plate are monolithic; and
the bottom fins and the bottom base-plate are monolithic.

6. The belt-splicer of claim 1, wherein:
the top cooler, comprising the top base-plate and the top fins, has been formed from a unitary top block of metal; and
the top fins have been created by machining away the spaces between the top fins;
the bottom cooler, comprising the bottom base-plate and the bottom fins, has been formed from a unitary bottom block of aluminum; and
the bottom fins have been created by machining away the spaces between the bottom fins.

7. The belt-splicer of claim 6, wherein the metal is aluminum or other metal having a thermal conductivity equal to or greater than that of magnesium.

8. The belt-splicer of claim 1, wherein:
the top cooler, comprising the top base-plate and integral top fins, has a mass of no more than 1.5 kilograms, per meter length of the base-plate;
the bottom cooler, comprising the bottom base-plate and integral bottom fins, has a mass of no more than 1.5 kilograms, per meter length of the base-plate.

9. The belt-splicer of claim 1, wherein:
the top cooler is so structured that the surface area of the metal of the top base-plate and top fins that is exposed to fan-blown cooling air during the cool-down phase is 2500 sq.cm, or more, per meter length of the base-plate;
the bottom cooler is so structured that the surface area of the metal of the bottom base-plate and bottom fins that is exposed to fan-blown cooling air during the cool-down phase is 2500 sq.cm, or more, per meter length of the base-plate.

10. The belt-splicer of claim 1, wherein:
a top thermal-tray-assembly of the top platen assembly includes:
a top tray of sheet metal, formed as a floor with upstanding side-walls, defining a top cavity therebetween;
the top pressure surface being an outwards-facing surface of the top sheet-metal tray;
the following components are located in the top cavity, in order, from the floor:
the top heater, in the form of a top electrical heating-pad;
the top cooler;
a top layer of heat-insulating material;
a bottom thermal-tray-assembly of the bottom platen assembly includes:
a bottom tray of sheet metal, formed as a floor with upstanding side-walls, defining a bottom cavity therebetween;
the bottom pressure surface being an outwards-facing surface of the bottom sheet-metal tray;
the following components are located in the bottom cavity, in order, from the floor:
the bottom heater, in the form of a bottom electrical heating-pad;
the bottom cooler;
a bottom layer of heat-insulating material.

11. The belt-splicer of claim 10, wherein:
the side-walls of the top sheet-metal tray are formed with folded-in lips, whereby the top cavity is at least partially roofed-over, and is constrained as to its height;
the top thermal-tray-assembly is so arranged that the said top components slide in/out with respect to the top cavity; and
the top components, once assembled into the top sheet-metal-tray, are retained therein, and resist moving with respect thereto, during handling and usage thereof;
the side-walls of the bottom sheet-metal tray are formed with folded-in lips, whereby the bottom cavity is at least partially roofed-over, and is constrained as to its height;

the bottom thermal-tray-assembly is so arranged that the said bottom components slide in/out with respect to the bottom cavity; and the bottom components, once assembled into the bottom sheet-metal-tray, are retained therein, and resist moving with respect thereto, during handling and usage thereof.

12. The belt-splicer of claim 11, wherein the top thermal-tray-assembly includes also the following top supplementary layers:

a top thin film of polyimide, or other electrical insulation material, located between the top heater pad and the top floor;

a top thin film of polyimide, or other electrical insulation material, located between the heater pad and the top cooler;

a top thermal-evenness layer, located next to the top floor, in which the material of the layer, under the compression provided by the pressure-bag, conforms to the material of the top floor in such manner as to significantly even out differences and gradients of temperature between different points on the floor;

a top cover-plate, which engages the tips of the top fins, preventing the escape of air from between the top fins, and constraining the blown-air to pass along between the top fins;

and wherein the bottom thermal-tray-assembly includes also the following bottom supplementary layers:

a bottom thin film of polyimide, or other electrical insulation material, located between the bottom heater pad and the bottom floor;

a bottom thin film of polyimide, or other electrical insulation material, located between the heater pad and the bottom cooler;

a bottom thermal-evenness layer, located next to the bottom floor, in which the material of the layer, under the compression provided by the pressure-bag, conforms to the material of the bottom floor in such manner as to significantly even out differences and gradients of temperature between different points on the floor;

a bottom cover-plate, which engages the tips of the bottom fins, preventing the escape of air from between the bottom fins, and constraining the blown-air to pass along between the bottom fins.

13. The belt-splicer of claim 10, wherein:

the pressure-bag is located in the top housing;

the pressure-bag, when inflated, exerts a downwards force on the top thermal-tray-assembly and on the top pressure-surface, and reacts that force by way of an upwards force on the top housing;

the top pressure-surface is movable down/up, relative to the top housing, responsively to the pressure-bag being inflated/deflated;

the top thermal-tray-assembly is spring-loaded with respect to the top housing, in the direction to collapse the pressure-bag;

the bottom pressure-surface remains fixed with respect to the bottom housing when the pressure-bag is inflated/deflated.

14. The belt-splicer of claim 1, wherein:

a top thermal-tray-assembly of the splicer includes:

a top tray of sheet metal, formed as a floor with upstanding side-walls, defining a top cavity therebetween;

the top cooler is located in the top cavity;

the top cooler is so arranged that blown air is received into the spaces between the top fins of the top cooler, and the fins split the received air into multiple channels which direct the air along the top cooler; and the top fins are arranged to direct air emerging from the channels out through top openings in the side-walls of the top sheet-metal-tray;

a bottom thermal-tray-assembly of the splicer includes:

a bottom tray of sheet metal, formed as a floor with upstanding side-walls, defining a bottom cavity therebetween;

the bottom cooler is located in the bottom cavity;

the bottom cooler is so arranged that blown air is received into the spaces between the bottom fins of the bottom cooler, and the bottom fins split the received air into multiple channels which direct the air along the bottom cooler; and the bottom fins are arranged to direct air emerging from the channels out through bottom openings in the side-walls of the bottom sheet-metal-tray.

15. The belt-splicer of claim 1, wherein:

during preparation for a splicing operation, the to-be-spliced ends of the belt are clamped firmly to the bottom-housing, being the housing in which the corresponding pressure-surface does not move; and the belt ends are so arranged in the splicer that, when the pressure-bag is inflated and the top pressure-surface moves towards the bottom pressure-surface, such movement acts to urge the belt ends together.

16. The belt-splicer of claim 1, wherein the structure of the splicer is such that, at least during the heat-up and heat-soak phases:

in respect of any top heat-conducting component of the top platen assembly that is in heat-conducting contact with the top heater, there is substantially no heat-conducting contact between that component and the housings of the splicer;

in respect of any bottom heat-conductive component of the bottom platen assembly that is in heat-conducting contact with the bottom heater, there is substantially no heat-conducting contact between that component and the housings of the splicer.

17. The belt-splicer of claim 1, wherein:

the splicer includes an inflation sub-tray-assembly, upon which are carried an air compressor for inflating the pressure-bag and a tube or hose for connecting to same;

the splicer includes a controller sub-tray-assembly, upon which are carried control components and connectors, for receiving signals from sensors, including temperature sensors, and a processor for automatically controlling the phases and operations of the splicer in response to the signals;

the sub-tray assemblies are structured and arranged to slide in/out of slideways in the housings.

18. The belt-splicer of claim 17, wherein:

the inflation sub-tray-assembly is arranged to slide in/out of a slideway in the top housing; and the controller sub-tray-assembly is arranged to slide in/out of a slideway in the bottom housing.

19. The belt-splicer of claim 14, wherein:

the top air-blower includes a top fan or fans;

the bottom air-blower includes a bottom fan or fans;

in respect of each fan, the fan is mounted into one of the thermal-tray-assemblies in that:

an outlet-tube of the fan engages inside a length of semi-flexible tubing;

the semi-flexible tubing is a tight fit over a length of rigid tubing;

the rigid tubing is cemented to a cover plate, which overlies the fins of the cooler, and the spaces between the fins;

the splicer is absent any support for the fan, other than the engagement of its outlet-tube with the tubing.

* * * * *